United States Patent
Kakishima et al.

(10) Patent No.: US 11,438,965 B2
(45) Date of Patent: Sep. 6, 2022

(54) USER EQUIPMENT IN WIRELESS COMMUNICATION SYSTEM

(71) Applicant: NTT DOCOMO, INC., Tokyo (JP)

(72) Inventors: Yuichi Kakishima, Tokyo (JP); Satoshi Nagata, Tokyo (JP); Toru Uchino, Tokyo (JP); Min Liu, Beijing (CN); Chongning Na, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 71 days.

(21) Appl. No.: 16/962,623

(22) PCT Filed: Jan. 18, 2019

(86) PCT No.: PCT/US2019/014140
§ 371 (c)(1),
(2) Date: Jul. 16, 2020

(87) PCT Pub. No.: WO2019/143900
PCT Pub. Date: Jul. 25, 2019

(65) Prior Publication Data
US 2020/0359459 A1  Nov. 12, 2020

Related U.S. Application Data

(60) Provisional application No. 62/619,647, filed on Jan. 19, 2018.

(51) Int. Cl.
*H04W 56/00* (2009.01)
*H04W 88/06* (2009.01)
(Continued)

(52) U.S. Cl.
CPC ........... *H04W 88/06* (2013.01); *H04L 1/1819* (2013.01); *H04W 72/042* (2013.01);
(Continued)

(58) Field of Classification Search
CPC ... H04W 88/06; H04W 76/27; H04W 72/042; H04W 72/0446; H04W 72/0493; H04W 80/02
(Continued)

(56) References Cited

U.S. PATENT DOCUMENTS

2019/0222284 A1* 7/2019 Huang .................. H04L 5/0053
2019/0222289 A1* 7/2019 John Wilson ......... H04L 5/0073

OTHER PUBLICATIONS

3GPP TS 36.211 V14.3.0 "3rd Generation Partnership Project; Technical Specification Group Radio Access Network; Evolved Universal Terrestrial Radio Access (E-UTRA); Physical channels and modulation (Release 14)" Jun. 2017 (195 pages).
(Continued)

*Primary Examiner* — Sai Ming Chan
(74) *Attorney, Agent, or Firm* — Osha Bergman Watanabe & Burton LLP

(57) ABSTRACT

A user equipment (UE) includes a receiver that receives, from a base station (BS), one or more Transmission Configuration Indication (TCI) states for Physical Downlink Control Channel (PDCCH) reception via Radio Resource Control (RRC) signaling and a Medium Access Control Control Element (MAC CE) activation command for one of the TCI states via a Physical Downlink Shared Channel (PDSCH). The UE further includes a transmitter that transmits, to the BS, a Hybrid Automatic Repeat reQuest (HARQ) for the MAC CE activation command in a slot and a processor that activates the one of the TCI states k slots after the slot where the transmitter transmits the HARQ. A value of the k indicates a number of slots.

5 Claims, 13 Drawing Sheets

(51) Int. Cl.
  H04W 76/27 (2018.01)
  H04L 1/18 (2006.01)
  H04W 72/04 (2009.01)
  H04W 80/02 (2009.01)
(52) U.S. Cl.
  CPC ... *H04W 72/0446* (2013.01); *H04W 72/0493* (2013.01); *H04W 76/27* (2018.02); *H04W 80/02* (2013.01)
(58) Field of Classification Search
  USPC .......................................................... 370/329
  See application file for complete search history.

(56) References Cited

OTHER PUBLICATIONS

3GPP TS 36.213 V14.3.0 "3rd Generation Partnership Project; Technical Specification Group Radio Access Network; Evolved Universal Terrestrial Radio Access (E-UTRA); Physical layer procedures (Release 14)" Jun. 2017 (460 pages).

3GPP TSG RAN WG1 Meeting 90bis; R1-1718551 "Discussion on QCL" Qualcomm Incorporated; Prague, Czech; Oct. 9-13, 2017 (9 pages).

3GPP TSG-RAN WG1 #90bis; R1-1718541 "Beam management for NR" Qualcomm; Prague, P.R. Czechia; Oct. 9-13, 2017 (17 pages).

International Search Report issued in International Application No. PCT/US2019/014140, dated Apr. 15, 2019 (3 pages).

Written Opinion issued in International Application No. PCT/US2019/014140; dated Apr. 15, 2019 (8 pages).

Office Action issued in counterpart Japanese Application No. 2020-539213 dataed Sep. 14, 2021 (6 pages).

NTT DOCOMO; "Remaining details on CSI-RS"; 3GPP TSG RAN WG1 Meeting #92, R1-1802475; Athens, Greece, Feb. 26-Mar. 2, 2018 (4 pages).

Samsung; "Remaining Issues on Beam Management"; 3GPP TSG RAN WG1 Meeting #94bis, R1-1810839; Chengdu, China, Oct. 8-12, 2018 (7 pages).

OPPO; "Discussion on Multi-beam Operation Enhancements"; 3GPP TSG RAN WG1 Meeting #94bis, R1-1810970; Chengdu, China, Oct. 8-12, 2018 (6 pages).

OPPO; "Text proposals for Beam management"; 3GPP TSG RAN WG1 Meeting #94bis, R1-1810971; Chengdu, China, Oct. 8-12, 2018 (8 pages).

* cited by examiner

USER EQUIPMENT IN WIRELESS COMMUNICATION SYSTEM

TECHNICAL FIELD

One or more embodiments disclosed herein relate to a user equipment (UE) that controls radio transmission and reception based on a Medium Access Control Control Element (MAC CE) activation command.

BACKGROUND

In a New Radio (NR; fifth generation (5G) radio access technology) system, a candidate set of downlink reference signals (RSs) are configured using a Radio Resource Control (RRC) mechanism. For example, higher layer parameters Transmission Configuration Indication (TCI) states are used for Physical Downlink Control Channel (PDCCH) reception at a UE and controlled by a MAC CE activation command from a base station (BS).

However, in the conventional method, the MAC CE timing design for PDCCH beam indication, that is, how the UE performs the PDCCH reception based on the MAC CE activation command was not determined. Further, the MAC CE timing designs for Physical Downlink Shared Channel (PDSCH) and Physical Uplink Control Channel (PUCCH) beam indication were not defined.

CITATION LIST

Non-Patent Reference
[Non-Patent Reference 1] 3GPP, TS 36.211 V 14.3.0
[Non-Patent Reference 2] 3GPP, TS 36.213 V14.3.0

SUMMARY

One or more embodiments of the present invention relate to a UE that includes a receiver that receives, from a BS, TCI states for PDCCH reception via RRC signaling and a MAC CE activation command for one of the TCI states via a PDSCH. The UE further includes a transmitter that transmits, to the BS, a Hybrid Automatic Repeat reQuest (HARQ) for the MAC CE activation command in a slot and a processor that activates the one of the TCI states k slots after the slot where the transmitter transmits the HARQ. A value of the k indicates a number of slots.

One or more embodiments of the present invention relate to a UE that includes a receiver that receives, from a BS, multiple TCI states for PDSCH reception via RRC signaling and a MAC CE activation command indicating activated TCI states of the multiple TCI states via a PDSCH. The UE further includes a transmitter that transmits, to the BS, a HARQ for the MAC CE activation command in a slot. The receiver receives Downlink Control Information (DCI) indicating a predetermined TCI state for the PDSCH reception. The UE further includes a processor that applies one the activated TCI state corresponding to the predetermined TCI state k slots after the slot where the transmitter transmits the HARQ. A value of the k indicates a number of slots.

One or more embodiments of the present invention relate to a UE that includes a receiver that receives, from a BS, one or more spatial relation information configurations for PUCCH transmission via RRC signaling and a MAC CE activation command used to activate one of the spatial relation information configurations via a PDSCH. The UE further includes a transmitter that transmits, to the BS, a HARQ for the MAC CE activation command in a slot and a processor that activates the one of the spatial relation information configurations k slots after the slot where the transmitter transmits the HARQ. A value of the k indicates a number of slots.

One or more embodiments of the present invention can provide a UE that performs PDCCH and PDSCH reception and PUCCH transmission properly based on reception of a MAC CE activation command by applying the MAC CE activation command "k" slots after a slot where the UE transmits the HARQ for the MAC CE activation command.

Other embodiments and advantages of the present invention will be recognized from the description and figures.

DETAILED DESCRIPTION

Embodiments of the present invention will be described in detail below, with reference to the drawings. In embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
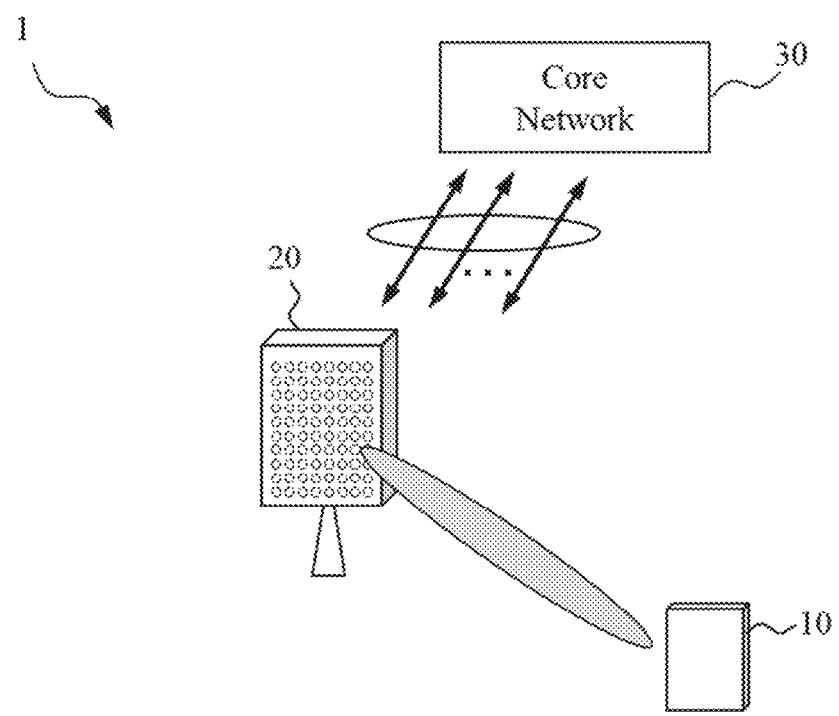
FIG. 1 is a diagram showing a wireless communication system according to one or more embodiments of the present invention.

FIG. 1 is a diagram showing a wireless communication system 1 according to one or more embodiments of the present invention. The wireless communication system 1 may be a New Radio (NR) system.

The wireless communication system 1 includes a user equipment (UE) 10, a gNodeB (gNB) 20, and a core network 30. The wireless communication system 1 is not limited to the specific configurations described herein and may be any type of wireless communication system such as an LTE/LTE-Advanced (LTE-A) system. The wireless communication system 1 may control operations for beam indication for a PDCCH, PDSCH, and PUCCH based on MAC CE activation command.

The gNB 20 may be a station that communicates with the UE 10 and may also be referred to as a base station (BS), a transmission and reception point (TRP), and an access point, etc. The gNB 20 may provide a communication coverage are for a particular geographic area, which may be referred to as a cell.

The gNB 20 includes antennas, a communication interface to communicate with an adjacent gNB 20 (for example, X2 interface), a communication interface to communicate with the core network 30 (for example, S1 interface), and a CPU (Central Processing Unit) such as a processor or a circuit to process transmitted and received signals with the UE 10. Operations of the gNB 20 may be implemented by the processor processing or executing data and programs stored in a memory. However, the gNB 20 is not limited to the hardware configuration set forth above and may be realized by other appropriate hardware configurations as understood by those of ordinary skill in the art. Numerous gNBs 20 may be disposed so as to cover a broader service area of the wireless communication system 1.

The UE 10 may be dispersed throughout the wireless communication system 1, and each UE 10 may be stationary or mobile. The UE 10 may be referred to as a terminal, a mobile station, a subscriber unit, or a station. The UE 10 may be a cellular phone, a smartphone, a tablet, a sensor, a personal digital assistant (PDA), a wireless modem, a netbook, a smartbook, a wireless communication device, a handheld device, a laptop computer, a cordless phone, a wireless local loop (WLL) station, or information processing apparatus having a radio communication function such as a wearable device. The UE10 may communicate with the gNB(s) 20.

The UE 10 includes a CPU such as a processor, a RAM (Random Access Memory), a flash memory, and a radio communication device to transmit/receive radio signals to/from the gNB 20 and the UE 10. For example, operations of the UE 10 described below may be implemented by the CPU processing or executing data and programs stored in a memory. However, the UE 10 is not limited to the hardware configuration set forth above and may be configured with, e.g., a circuit to achieve the processing described below.

In the wireless communication system 1, uplink (UL) communication may indicate communication from the UE 10 to the gNB 20. Downlink (DL) communication may indicate communication from the gNB 20 to the UE 10. Each gNB 20 includes at least a radio frequency transmitter and at least a receiver used to communicate with the UE, which may move freely around it. Similarly, each UE 10 includes at least a radio frequency transmitter and at least a receiver used to communicate with the gNB 20.

In one or more embodiments of the present invention, use of multiple antennas at both a transmission point (e.g., gNB 20 or UE 10) and a reception point (e.g., UE 10 or gNB 20) in the wireless communication system 1 along with related baseband signal processing may be referred to as Multiple-Input Multiple-Output (MIMO) technology. In a MU-MIMO system, precoding is applied at the transmission point in order to suppress mutual interference experienced by each reception point caused by transmissions to other reception points. MU-MIMO precoding is spatial encoding of the transmitted signal based on propagation channel. In order to apply MU-MIMO precoding, the transmission point is required to know Channel State Information (CSI) of radio channels connecting the transmission point to each of the reception point for transmission. In the wireless communication system 1, the reception point (e.g., UE 10) may measure CSI and report the measured CSI to the transmission point (e.g., gNB 20) via an UL feedback channel. The reporting CSI may be referred to as CSI feedback. The CSI feedback includes at least one of a CSI-Reference Signal (CSI-RS) Indicator (CRI), a Reference Signal Received Power (RSRP) value, a Rank Indicator (RI), a Precoding Matrix Indicator (PMI), a Channel Quality Indicator (CQI) for each DL component channel (CC).

In one or more embodiments of the present invention, several types of physical channels are used for the DL transmission in the wireless communication system 1. The physical channels may convey information from higher layers in the 5G stack. In contrast to physical signals, the physical channels may convey information that is used exclusively within the physical (PHY) layer. For example, the DL physical channels may be a PDSCH, a Physical Broadcast Channel (PBCH), a Physical Multicast Channel (PMCH), a Physical Control Format Indicator Channel (PCFICH), a PDCCH, and a Physical Hybrid ARQ Indicator Channel (PHICH). For example, UL physical channels may be a Physical Uplink Shared Channel (PUSCH) and a PUCCH.

In one or more embodiments of the present invention, the wireless communication system 1 may utilize at least one of a Frequency Division Duplex (FDD) mode and a Time Division Duplex (TDD) mode. In the FDD mode, a DL channel and a UL channel may be allocated to different frequency channels, respectively, and DL transmissions and UL transmissions may be performed concurrently on the two frequency channels. In the TDD mode, a DL channel and an DL channel may share the same frequency channel, and DL transmissions and UL transmissions may be sent on the same frequency channel in different time periods.

For both of the FDD and TDD modes, a subframe used for the DL may be referred to as a DL subframe. A subframe used for the UL may be referred to as an UL subframe. A CC configured for the FDD mode may be referred to as an FDD CC. A CC configured for TDD may be referred to as a TDD CC. A subframe can be called a slot.

For both of the FDD and TDD modes, at least one of a Physical Downlink Control Channel (PDCCH) and other physical channels may be transmitted in a control region of a DL subframe with in the cell. The PDCCH may carry DL control information (DCI) such as DL grants, UL grants, etc. The cell may also transmit a Physical Downlink Shared Channel (PDSCH) and/or other physical channels in a data region of a DL subframe. The PDSCH may carry data for UEs scheduled for data transmission on the DL.

For both of the TDD and FDD modes, the UE 10 may transmit either the PUCCH in a control region of an UL subframe or the PUSCH in a data region of the UL subframe. For example, the PUCCH may carry channel state information (CSI) that indicates a channel state of the DL, and scheduling request. The PUSCH may carry at least one of user data and the CSI.

The wireless communication system 1 may support operations with multiple CCs, which may be referred to as carrier aggregation (CA) or multi-carrier operation. The UE 10 may be configured with multiple CCs for the DL and one or more CCs for the UL for carrier aggregation. The gNB 20 may transmit data and downlink control information (DCI) on one or more CCs to the UE 10. The UE 10 may transmit data and CSI on one or more CCs to the gNB 20.

Figure 2:
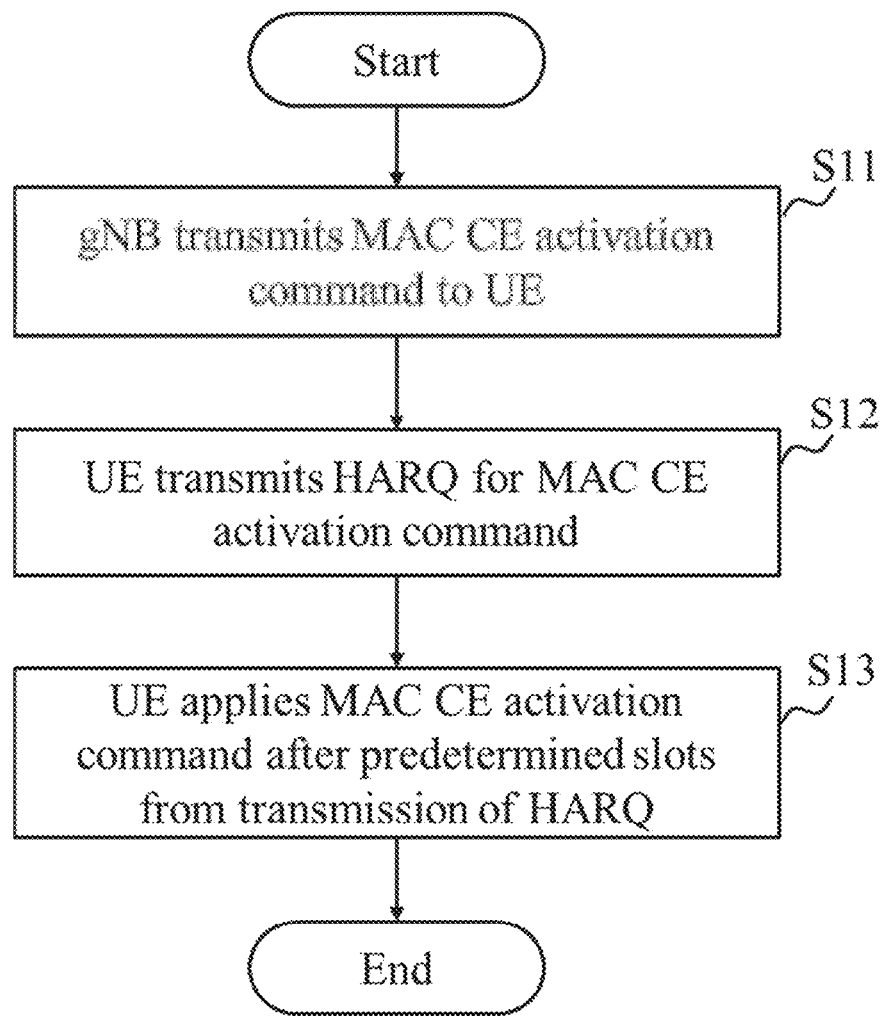
FIG. 2 is a flowchart diagram showing an example operation in a wireless communication system according to one or more embodiments of the present invention.

FIG. 2 is a flowchart diagram showing an example operation in the wireless communication system 1 according to one or more embodiments of the present invention. As shown FIG. 2, at step S1, the gNB 20 transmits MAC CE activation command provided by the PDSCH to the UE 10. At step S12, the UE 10 transmits a Hybrid ARQ (HARQ) for the MAC CE activation command to the gNB 20. At step S13, the UE 10 applies the MAC CE activation command for PDCCH after predetermined slots from the transmission of the HARQ. As a result, the UE 10 performs PDCCH reception, PDSCH reception, or PUCCH transmission and PDCCH, PDSCH, or PUCCH beam indication. The corresponding actions according to one or more embodiments of the present invention may be applied base on the MAC CE activation command.

In the conventional standard, when the UE 10 receives the MAC CE activation command, how and when the UE 10 performs corresponding actions shall be applied was not defined. One or more embodiments of the present invention provide methods clarify procedures of performing the corresponding actions based on the reception of the MAC CE activation command. Further, one or more embodiments of the present invention cause the gNB 20 to acknowledge the time when the MAC CE activation command is applied in the UE 10. MAC CE timing designs for PDCCH, PDSCH, and PUCCH beam indication according to embodiments of the present invention will be described below.

(MAC CE Timing Designs for PDCCH Beam Indication)

Figure 3:
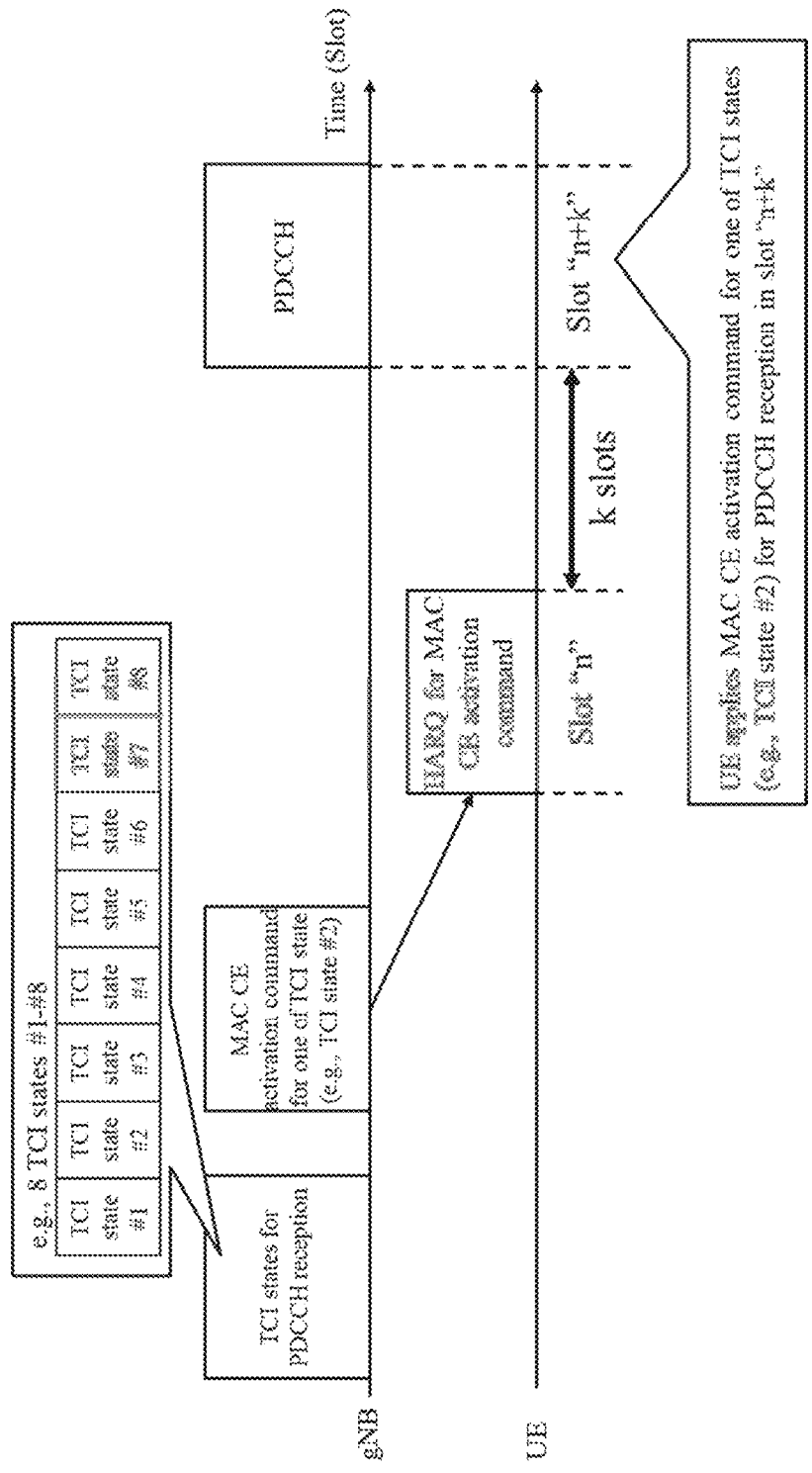
FIG. 3 is a diagram showing an example operation for PDCCH reception at a UE based on a MAC CE activation command according to one or more embodiments of the present invention.

FIG. 3 is a diagram showing an example operation for PDCCH reception at the UE 10 based on a MAC CE activation command according to one or more embodiments of the present invention. In FIG. 3, a horizontal axis represents a time domain. The time domain in FIG. 3 may be referred to as a slot. A subframe consists of one or more slots. For example, if 1 sub carrier is 15 kHz, 1 subframe is 1 slot and the slot length is 1 msec. If 1 sub carrier is 30 kHz, 1 subframe consists of 2 slots. If 1 sub carrier is 60 kHz, 1 subframe consists of 4 slots. If 1 sub carrier is 120 kHz, 1 subframe consists of 8 slots. The slot "n" represents the slot number.

As shown in FIG. 3, the gNB 20 transmits, to the UE 10, one or more TCI states for PDCCH reception at the UE 10 using Radio Resource Control (RRC) signaling. In an example of FIG. 3, the TCI states may be 8 TCI states #1-#8. The TCI states are configured with the UE 10 by the RRC signaling. In this example, the TCI state indicates a beam used for the PDCCH reception. The beam used for the PDCCH reception may be referred to as a PDCCH resource.

Further, the TCI state for PDCCH reception indicates a quasi co-location (QCL) relationship between one or more DL RSs (e.g., CSI-RSs) and ports for predetermined signals (e.g., Demodulation Reference Signals (DM-RSs) and Synchronization Signals (SSs)) of the PDCCH. The TCI state associates one or more DL RSs with a corresponding QCL type. The QCL type has four difference types of QCL such as QCL Types A, B, C, and D. In one or more embodiments of the present invention, the corresponding QCL type may be QCL Type D including a spatial Rx parameter that indicates DL beam indication.

Then, the gNB 20 transmits, to the UE 10, a MAC CE activation command for one of the TCI states using the PDSCH. In an example of FIG. 3, one of the TCI states to be activated based on the MAC CE activation command may be TCI state #2.

When the UE 10 receives the MAC CE activation command, the UE 10 transmits, to the gNB 20, a HARQ for the MAC CE activation command in slot "n". The HARQ is referred to as a HARQ-Ack. The slot "n" represents the slot number.

According to one or more embodiments of the present invention, the UE 10 may apply the MAC CE activation command for one of the TCI state (e.g., TCI state #2) in slot "n+k" based on the reception of the MAC CE activation command. The value "k" is the number of slots. The slot "n+k" represents the slot number.

Thus, the UE 10 may apply the MAC CE activation command "k" slots after the slot "n" where the UE 10 transmits the HARQ, which is the HARQ-Ack, and receive the PDCCH using the activated TCI state in slot "n+k". The applying the MAC CE activation command in slot "n+k" may be an example of corresponding actions in the UE 10. On the other hand, when the UE 10 generates and transmits the HARQ-Nack for the MAC CE activation command, the UE 10 does not apply the MAC CE activation command "k" slots after the slot "n" where the UE 10 transmits the HARQ-Nack.

In one or more embodiments of the present invention, for example, the value "k" may be a predetermined fixed value defined in the 3GPP specification. As another example, the value "k" may be configured by RRC signaling. That is, the gNB 20 may notify the UE 10 of the value "k" using the RRC signaling. As another example, "k" may be dynamically switched using at least one of the MAC CE and downlink control information (DCI).

As a result, the UE 10 may perform PDCCH reception for a beam indicated by the activated one of the TCI states the k slots after the slot where the UE 10 transmits the HARQ.

Thus, one or more embodiments of the present invention can provide the UE 10 that receives the PDCCH properly when the UE 10 receives the MAC CE activation command for one of the TC states for PDCCH reception by applying the MAC CE activation command "k" slots after slot "n" where the UE 10 transmits the HARQ.

Figure 4:
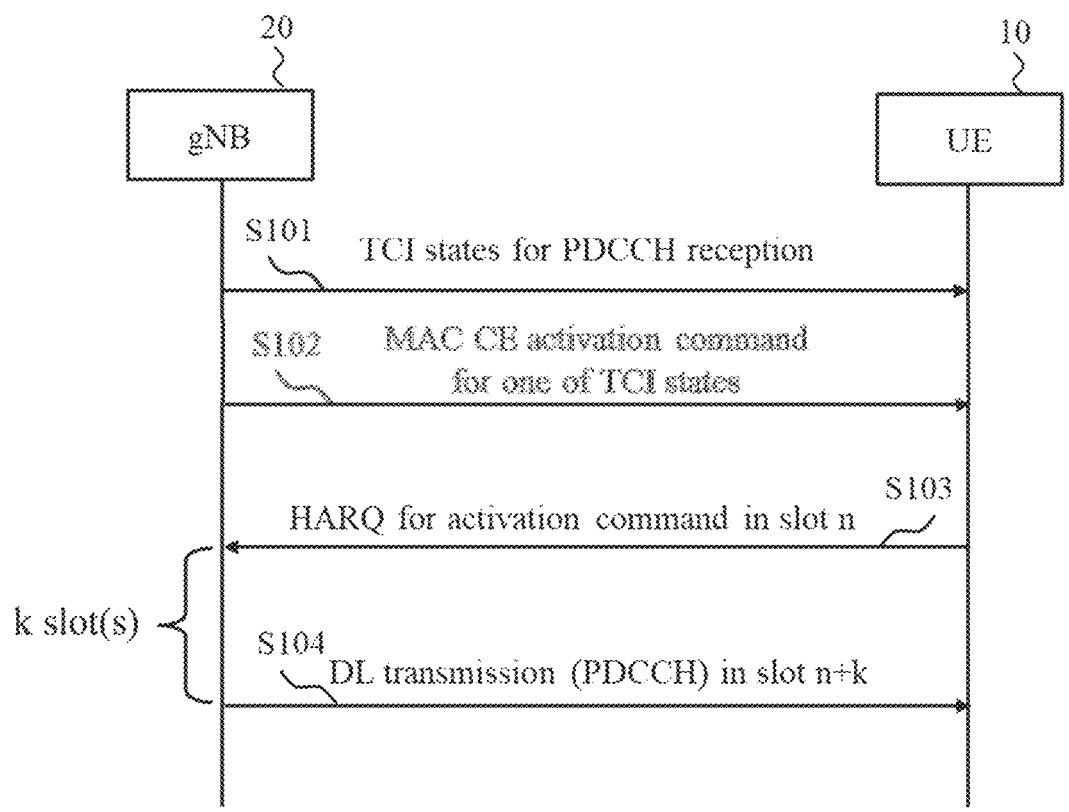
FIG. 4 is a sequence diagram showing an example operation for PDCCH reception at a UE based on a MAC CE activation command in the wireless communication system according to one or more embodiments of the present invention.

FIG. 4 is a sequence diagram showing an example operation in the wireless communication system 1 according to one or more embodiments of the present invention.

As shown in FIG. 4, at step S101, the gNB 20 transmits TCI states for PDCCH reception to the UE 10 via the RRC signaling.

Then, at step S102, the gNB 20 transmits, to the UE 10, the MAC CE activation command for one of the TCI states for PDCCH reception using the PDSCH.

At step S103, the UE 10 transmits the HARQ for the received MAC CE activation command in slot "n" and apply the MAC CE activation command in slot "n+k".

At step S104, when the gNB 20 receives the HARQ from the UE 10, the gNB 20 transmits the PDCCH in slot "n+k" to the UE 10. The UE 10 receives the PDCCH based on the MAC CE activation command in slot "n+k".

Figure 5:
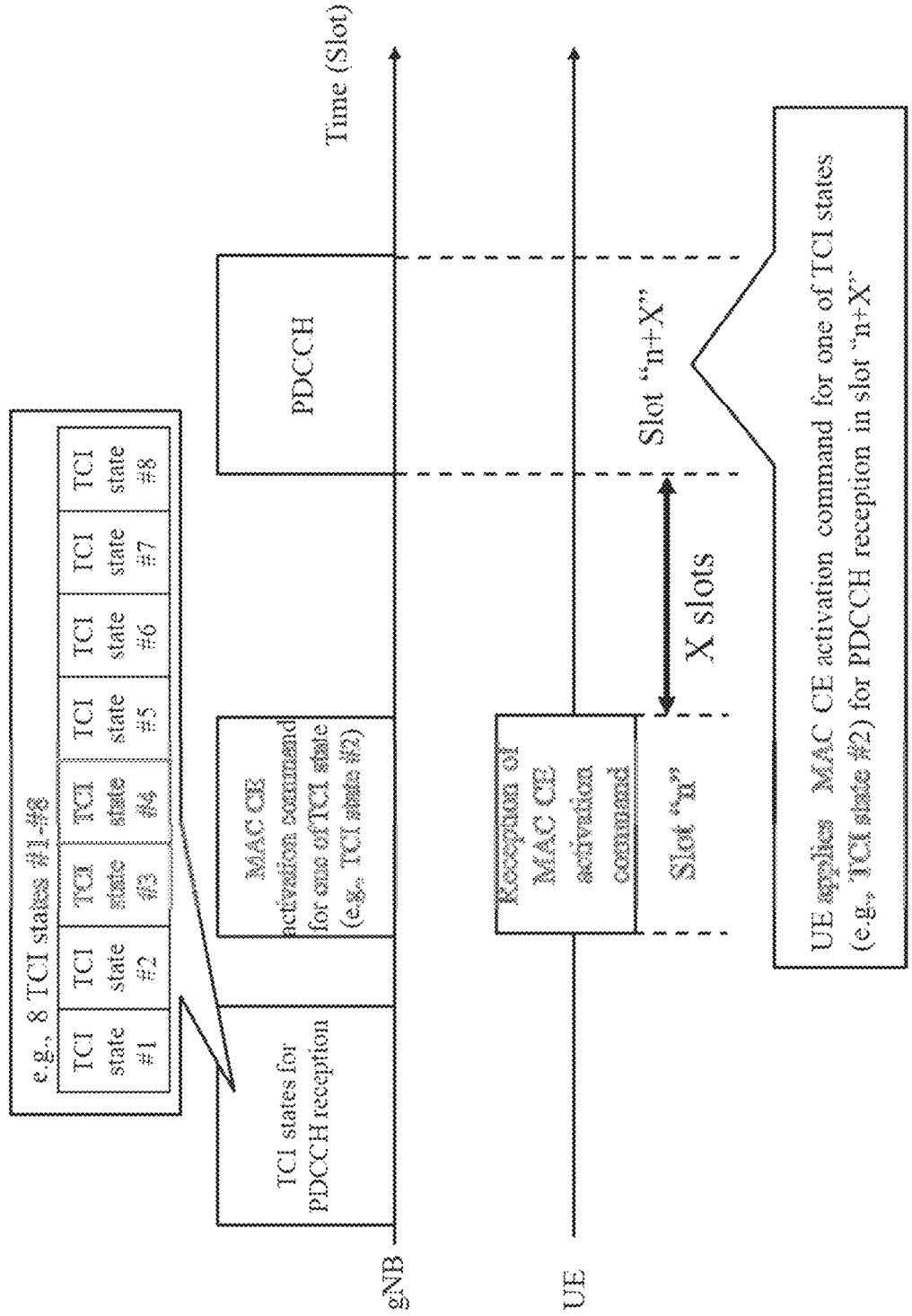
FIG. 5 is a diagram showing an example operation for PDCCH reception at a UE based on a MAC CE activation command according to one or more embodiments of another example the present invention.

As another example for PDCCH reception based on reception of the MAC CE activation command, an ambulatory timeline may be considered. As shown in FIG. 5, when the UE 10 receives a MAC CE activation command for one of the TCI states, corresponding actions and the TCI state for the PDCCH reception may be applied in the UE 10 no later than the minimum requirement and/or no earlier than slot "n+X". The slot "n" is a slot where the UE 10 receives the MAC CE activation command. The slot "n+X" represents the slot number. For example, value "X" may be a predetermined fixed value defined in the 3GPP specification. As another example, "X" may be configured by RRC signaling. As another example, "X" may be dynamically switched using at least one of the MAC CE and the DCI.

As another example for PDCCH reception based on reception of the MAC CE activation command, the value "k" in FIG. 3 may be 2k', where k' is the slots number for PDSCH HARQ receiving defined in 3GPP TS 38.213 Section 9.2.3.

(MAC CE Timing Designs for PDSCH Beam Indication)

Figure 6:
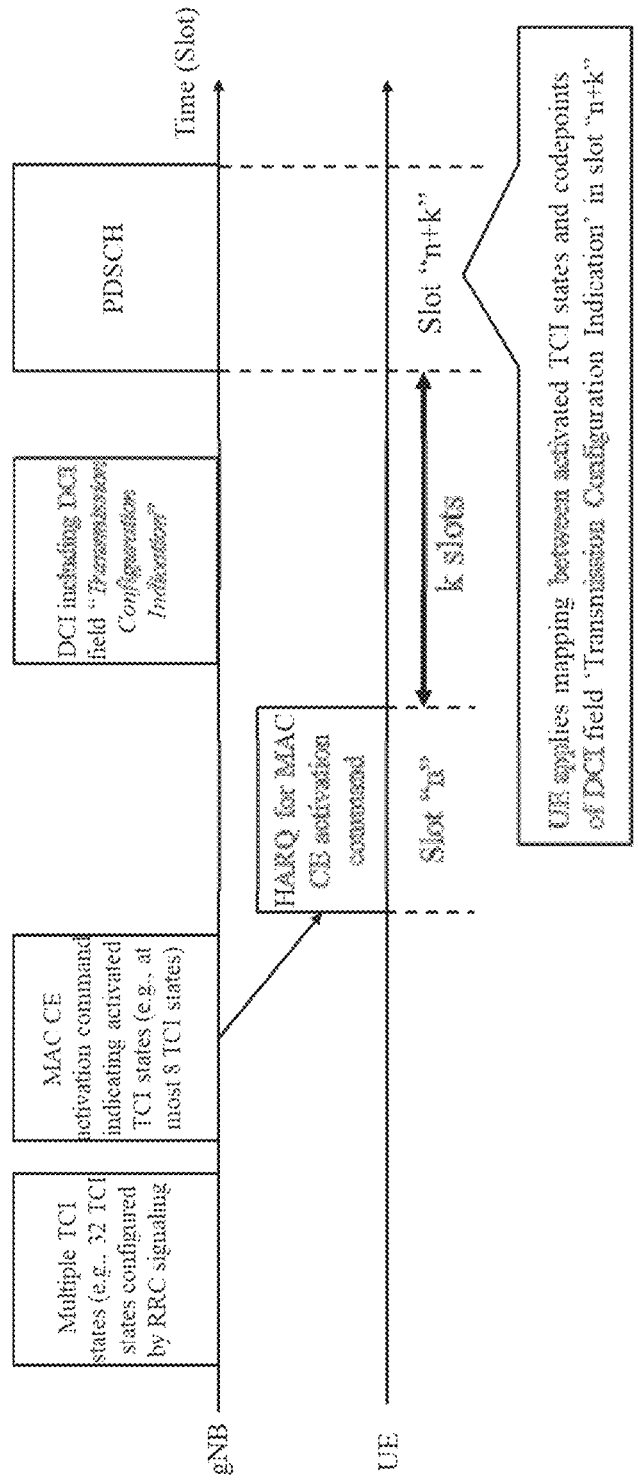
FIG. 6 is a diagram showing an example operation for PDSCH reception at a UE based on a MAC CE activation command according to one or more embodiments of the present invention.

FIG. 6 is a diagram showing an example operation for PDSCH reception at the UE 10 based on a MAC CE activation command according to one or more embodiments of the present invention.

As shown in FIG. 6, the gNB 20 transmits, to the UE 10, multiple TCI states using RRC signaling. For example, 32 TCI states may be configured with the UE 10 by the RRC signaling. In this example, the TCI state indicates a beam used for the PDSCH reception. The beam used for the PDSCH reception may be referred to as a resource or a PDSCH resource.

Further, the TCI state indicates a QCL relationship between one or more DL RSs (e.g., CSI-RSs) and ports for predetermined signals (e.g., DM-RSs and SSs) of the PDSCH. The TCI state associates one or more DL RSs with a corresponding QCL type such as QCL Type D including a spatial Rx parameter.

Then, the gNB 20 transmits a MAC CE activation command to the UE 10. The MAC CE activation command indicating activated TCI states of the configured TCI states for the PDSCH. The maximum number of the activated TCI is 8.

When the UE 10 receives the MAC CE activation command, the UE 10 transmits, to the gNB 20, a HARQ for the MAC CE activation command in slot "n". The value "n" is the slot number.

The gNB 20 transmits, to the UE 10, DCI including DCI field 'Transmission Configuration Indication' that indicates an activated (predetermined) TCI state for the scheduled PDSCH. The activated TCI state for the scheduled PDSCH state may be mapped to a codepoint in the DCI field. On the other hand, the deactivated TCI state may not be mapped to the codepoint in the DCI field.

The UE 10 may apply mapping each of the activated TCI states indicated in the MAC CE activation command to a codepoint of DCI field 'Transmission Configuration Indication' "k" slots after the slot "n" where the UE 10 transmits the HARQ. The value "k" is the number of slots. Thus, the UE 10 may apply one of the activated TCI sates corresponding to the activated (predetermined) TCI indicated in the DCI "k" slots in after the slot "n" where the UE 10 transmits the HARQ.

As a result, the UE 10 performs PDSCH reception for a beam indicated by at least one activated TCI state set as the activation status.

In one or more embodiments of the present invention, for example, "k" may be a predetermined fixed value defined in the 3GPP specification. As another example, "k" may be configured by RRC signaling. That is, the gNB 20 may notify the UE 10 of "k" using the RRC signaling. As another example, "k" may be dynamically switched using at least one of the MAC CE and DCI.

Figure 7:
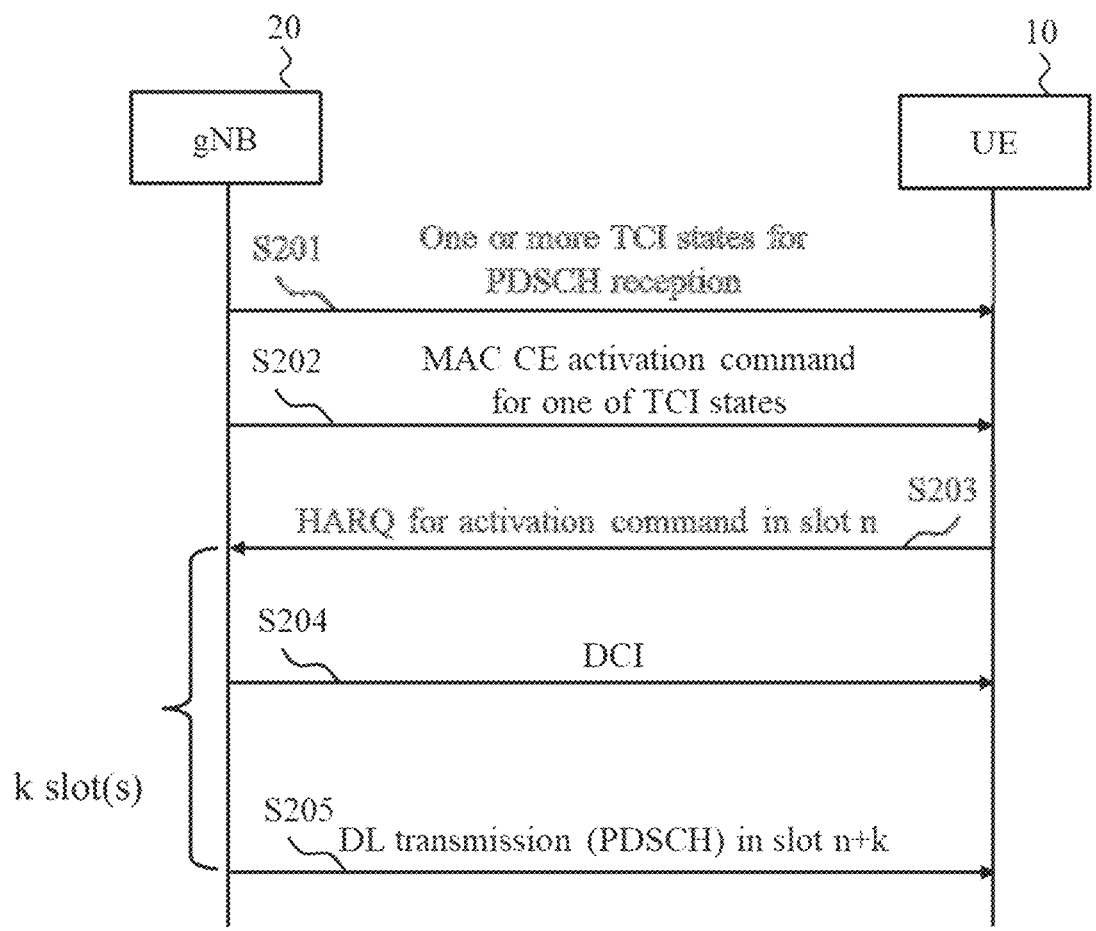
FIG. 7 is a sequence diagram showing an example operation for PDSCH reception based on a MAC CE activation command in a wireless communication system according to one or more embodiments of the present invention.

FIG. 7 is a sequence diagram showing an example operation in the wireless communication system 1 according to one or more embodiments of the present invention.

As shown in FIG. 7, at step S201, the gNB 20 transmits one or more TCI states for PDSCH reception to the UE 10 via the RRC signaling.

Then, at step S202, the gNB 20 transmits, to the UE 10, the MAC CE activation command that is used to activate one or more TCI states (i.e., beams) for the PDSCH.

At step S203, the UE 10 transmits the HARQ for the received MAC CE activation command in slot n.

At step S204, the gNB 20 transmits the DCI including the DCI field "Transmission Configuration Indication" to the UE 10.

At step S204, the UE 10 transmits, to the UE 10, the DCI including DCI field 'Transmission Configuration Indication.' The DCI indicates an activated TCI state used for the scheduled PDSCH for the PDSCH reception.

At step S205, the UE 10 applies the MAC CE activation command "k" slots after the slot "n" where the UE 10 transmits the HARQ. The UE 10 performs PDSCH reception for a PDSCH beam corresponding to the activated TCI state based on the MAC CE activation command that is set as the activation status.

Figure 8:
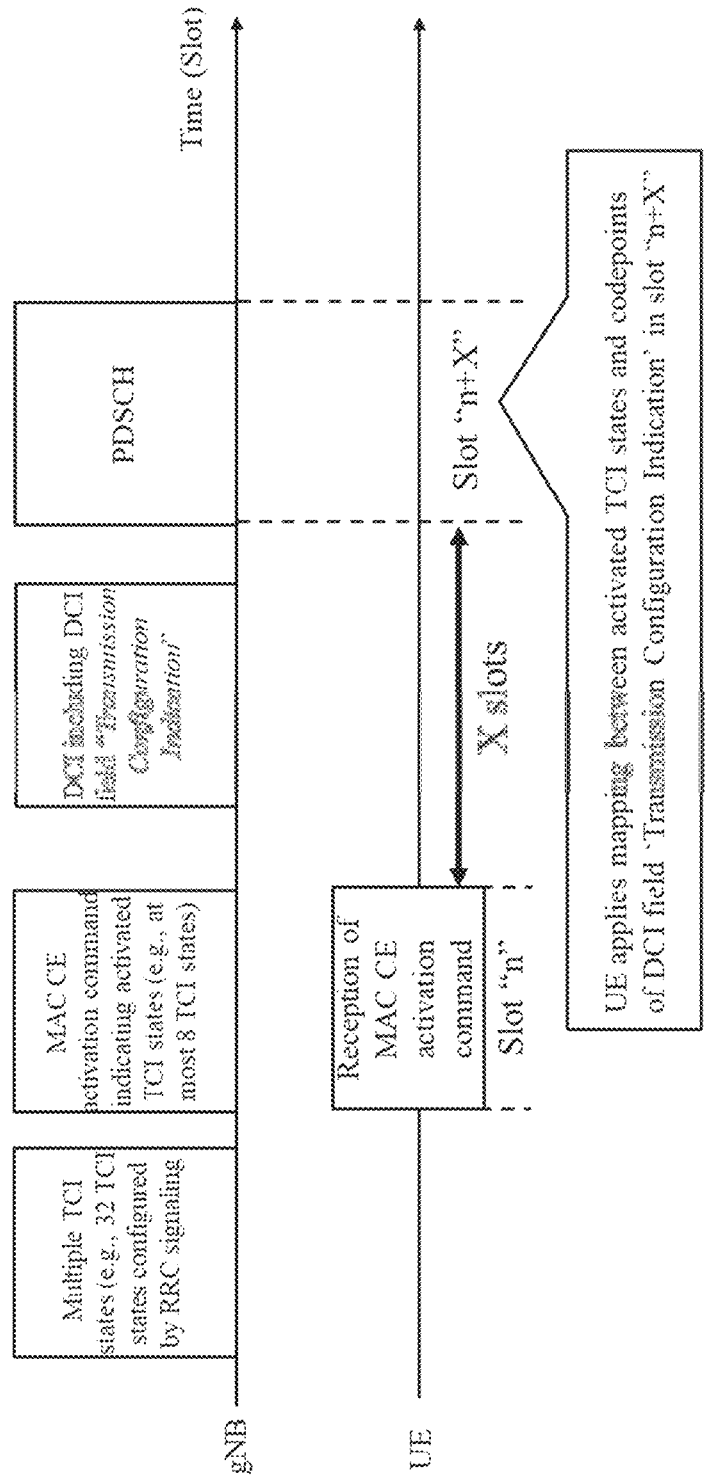
FIG. 8 is a diagram showing an example operation for PDSCH reception at a UE based on a MAC CE activation command according to one or more embodiments of another example the present invention.

As another example for PDCCH reception based on reception of the MAC CE activation command, an ambulatory timeline may be considered. As shown in FIG. 8, when the UE 10 receives a MAC CE activation command for one of the TCI states, corresponding actions on the TC state for the PDSCH may be applied in the UE 10 no later than the minimum requirement and/or no earlier than slot "n+X". The slot "n" is a slot where the UE 10 receives the MAC CE activation command via the PDSCH. The slot "n+X" represents the slot number. For example, value "X" may be a predetermined fixed value defined in the 3GPP specification. As another example, "X" may be configured by RRC signaling. As another example, "X" may be dynamically switched using at least one of the MAC CE and the DCI.

As another example for PDCCH reception based on reception of the MAC CE activation command, the value "k" in FIG. 3 may be 2k', where k' is the slots number for PDSCH HARQ receiving defined in 3GPP TS 38.213 Section 9.2.3.

(MAC CE Timing Designs for PUCCH Beam Indication)

Figure 9:
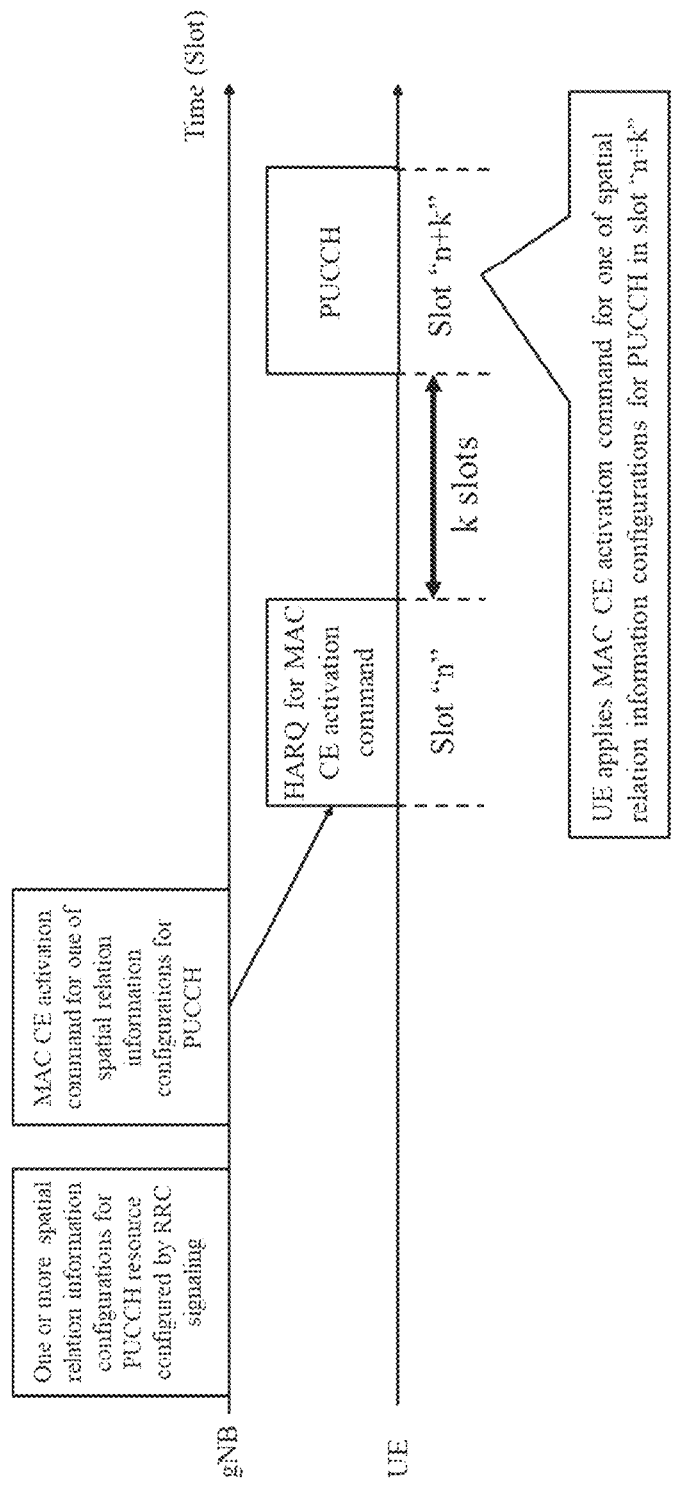
FIG. 9 is a diagram showing an example operation for PUCCH transmission at a UE based on a MAC CE activation command according to one or more embodiments of the present invention.

FIG. 9 is a diagram showing an example operation for PUCCH transmission at the UE 10 based on a MAC CE activation command according to one or more embodiments of the present invention.

As shown in FIG. 9, the gNB 20 notifies the UE 10 of one or more spatial relation information configurations for PUCCH transmission using the RRC signaling. The spatial relation information configuration may be a value for PUCCH-SpatialRelationInfold and indicate a beam for PUCCH transmission. The beam for PUCCH transmission may be referred to as a PUCCH resource.

Then, the gNB 20 transmits, to the UE 10, the MAC CE activation command used to activate one of spatial relation information configurations for PUCCH using the PDSCH. The MAC CE activation command may indicate a value of PUCCH-SpatialRelationInfold.

When the UE 10 receives the MAC CE activation command, the UE 10 transmits, to the gNB 20, a HARQ for the MAC CE activation command in slot "n". The value "n" is the slot number.

According to one or more embodiments of the present invention, the UE 10 may apply the MAC CE activation command for one of spatial relation information configurations for PUCCH in slot "n+k" based on the reception of the MAC CE activation command. That is, the UE 10 shall know the beam used for the PUCCH resource in slot "n+k". The value "k" is the number of slots. The slot "n+k" represents the slot number.

Thus, the UE 10 may apply the MAC CE activation command and activate one of the spatial relation information configurations "k" slots after the slot "n" where the UE 10 transmits the HARQ. The UE 10 performs the PUCCH transmission for a beam indicated by activated one of the spatial relation information configurations.

In one or more embodiments of the present invention, for example, "k" may be a predetermined fixed value defined in the 3GPP specification. As another example, "k" may be configured by RRC signaling. That is, the gNB 20 may notify the UE 10 of "k" using the RRC signaling. As another example, "k" may be dynamically switched using at least one of the MAC CE and DCI.

Figure 10:
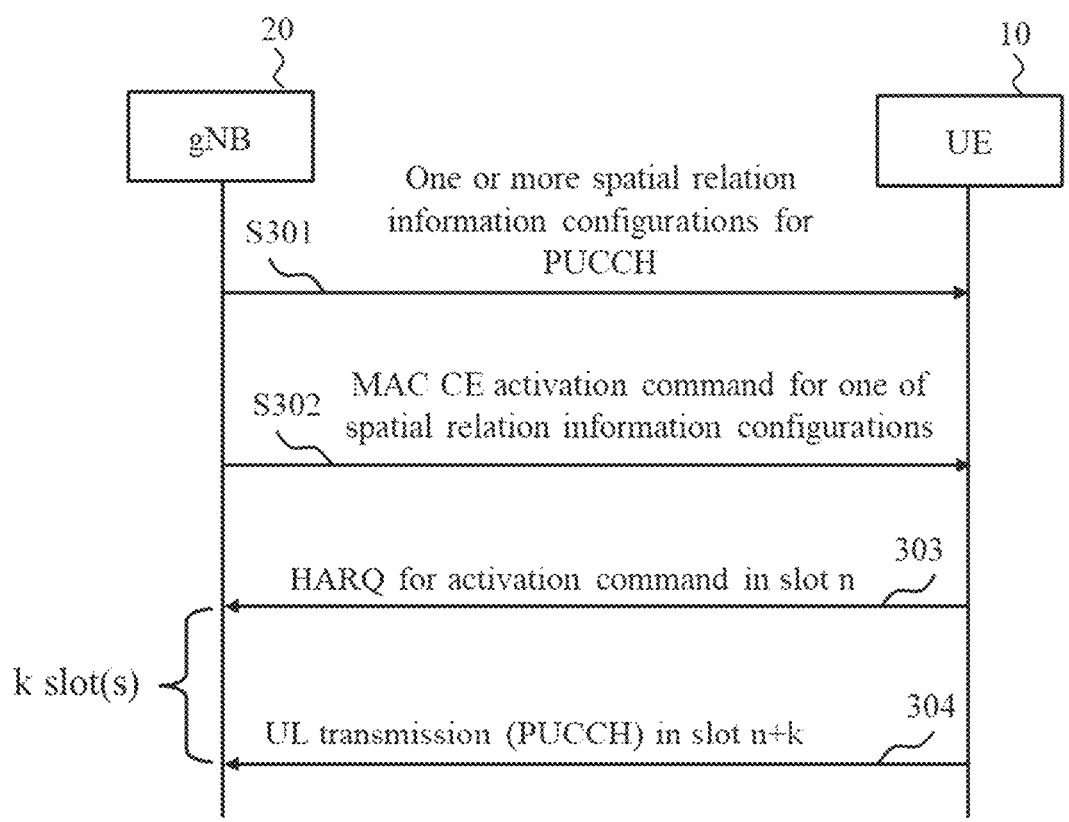
FIG. 10 is a sequence diagram showing an example operation for PUCCH transmission based on a MAC CE activation command in a wireless communication system according to one or more embodiments of the present invention.

FIG. 10 is a sequence diagram showing an example operation for the PUCCH transmission based on the MAC CE activation command in the wireless communication system 1 according to one or more embodiments of the present invention.

As shown in FIG. 10, at step S301, the gNB 20 transmits one or more spatial relation information configurations for the PUCCH resource to the UE 10 via the RRC signaling.

Then, at step S302, the gNB 20 transmits, to the UE 10, the MAC CE activation command used to activate one of spatial relation information configurations for the PUCCH resource using the PDSCH.

At step S303, the UE 10 transmits the HARQ for the received MAC CE activation command in slot "n" and applies the MAC CE activation command in slot "n+k".

At step S304, the UE 10 shall know the beam used for the PUCCH resource in slot "n+k." The UE 10 may transmit the PUCCH using the beam used for the PUCCH resource.

Figure 11:
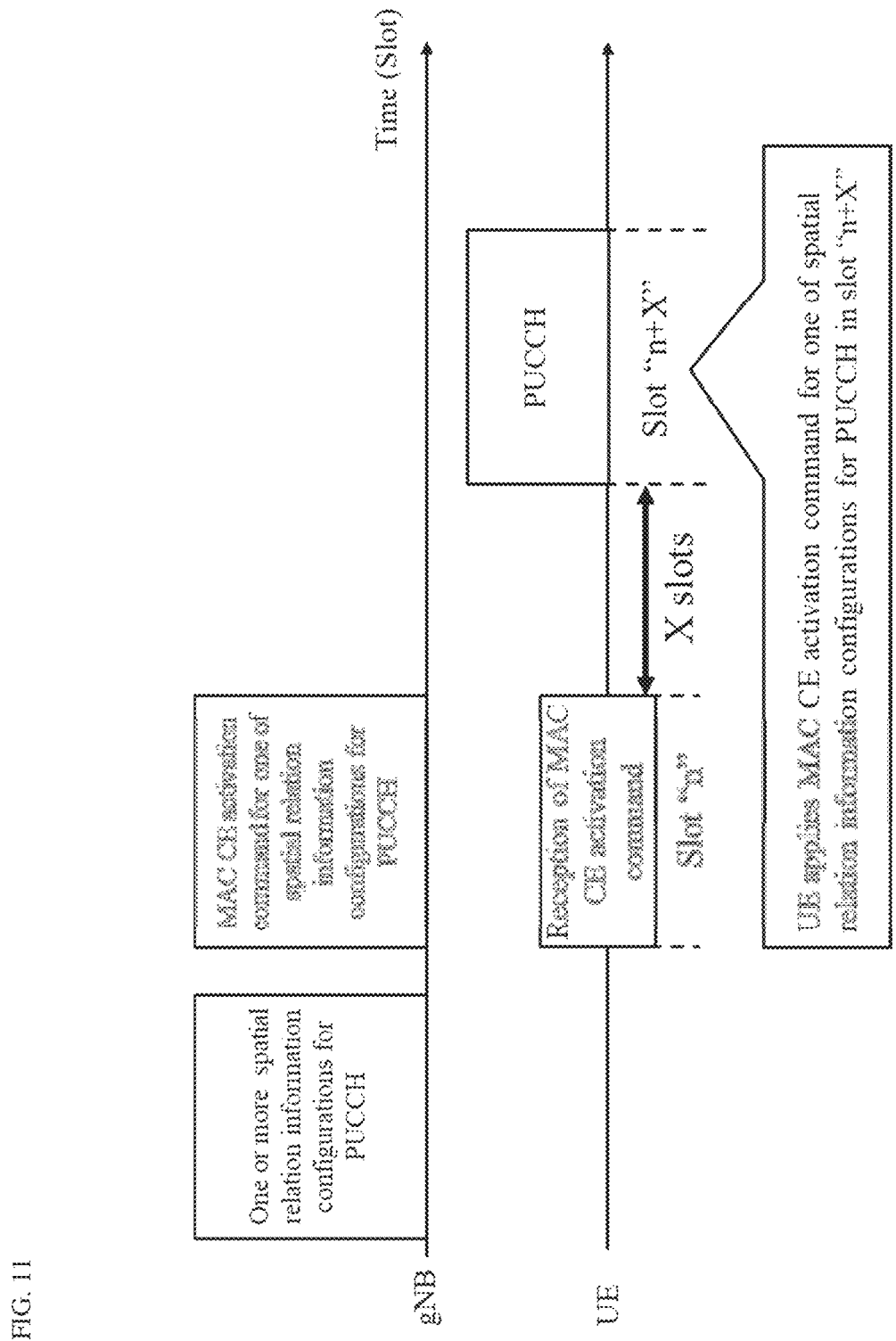
FIG. 11 is a diagram showing an example operation for PUCCH transmission at a UE based on a MAC CE activation command according to one or more embodiments of another example the present invention.

As another example for PUCCH transmission based on reception of the MAC CE activation command, an ambulatory timeline may be considered. As shown in FIG. 11, when the UE 10 receives a MAC CE activation command for one of spatial relation information configurations for the PUCCH, corresponding actions may be applied in the UE 10 no later than the minimum requirement and/or no earlier than slot "n+X". The slot "n" is a slot where the UE 10 receives the MAC CE activation command via the PDSCH. The slot "n+X" represents the slot number. For example, value "X" may be a predetermined fixed value defined in the 3GPP specification. As another example, "X" may be configured by RRC signaling. As another example, "X" may be dynamically switched using at least one of the MAC CE and the DCI.

As another example for PUCCH transmission based on reception of the MAC CE activation command, the value "k" in FIG. 3 may be 2k', where k' is the slots number for PDSCH HARQ receiving defined in 3GPP TS 38.213 Section 9.2.3.

One or more embodiments of the present invention may design the MAC CE content for beam indication. According to one or more embodiments of the present invention, a bitmap method similar to the MAC CE design for aperiodic CSI-RS defined in 3GPP TS 36.321 Section 6.1.3.14 may be applied. In the MAC CE design, N bits are used for N TCI states/spatial relation information configurations. As another example, the compressed MAC CE signaling design for TCI states/spatial relation information configurations activation/deactivation may be applied.

One or more embodiments of the present invention can avoid ambiguous timeline for the UE 10 and the gNB 20 after reception of the MAC CE activation command by clarifying when the MAC CE activation command is applied in the UE 10.

One or more embodiments of the present invention may be used for timing design for PUCCH/PDCCH/PDSCH beam indication to complete beam indication procedures using the MIMO technology to ensure the system work and provide high reliability service.

(Configuration of Base Station)

Figure 12:
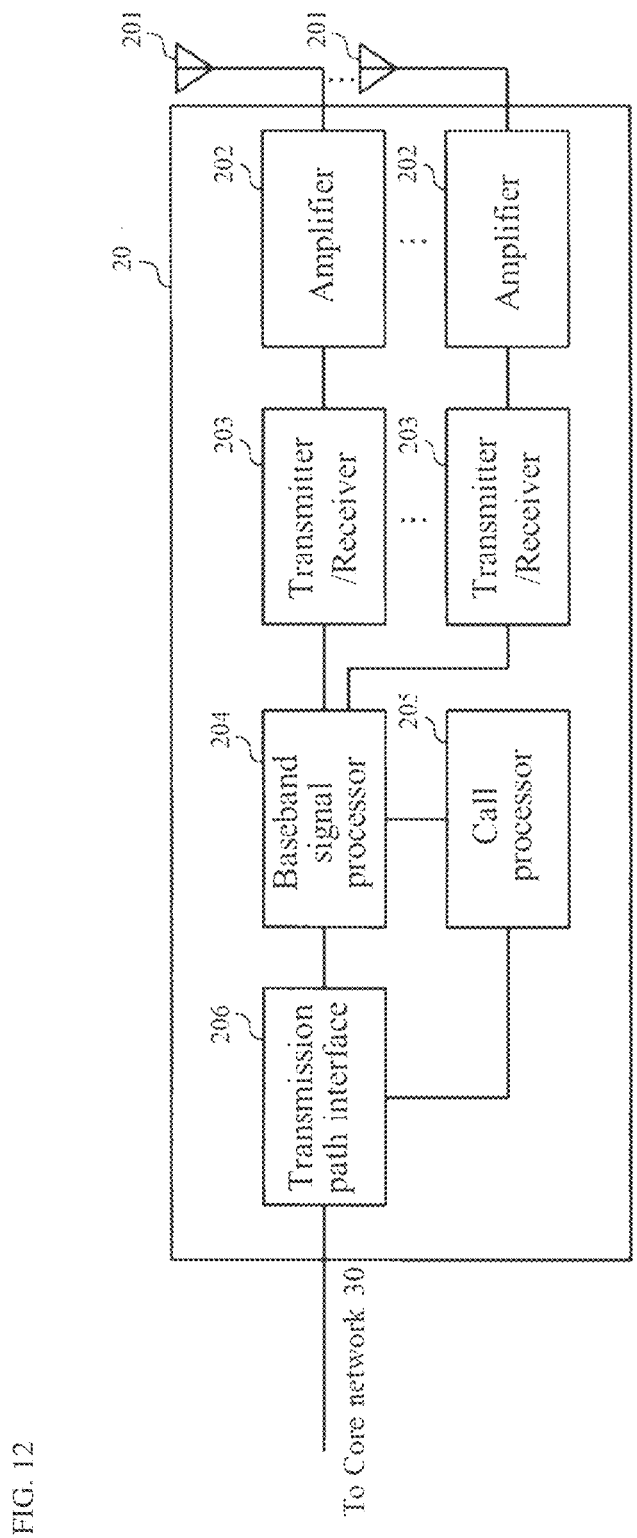
FIG. 12 is a diagram showing a schematic configuration of a base station (BS) according to one or more embodiments of the present invention.

The BS 20 according to one or more embodiments of the present invention will be described below with reference to FIG. 12. FIG. 12 is a diagram illustrating a schematic configuration of the BS 20 according to one or more embodiments of the present invention. The BS 20 may include a plurality of antennas (antenna element group) 201, amplifier 202, transceiver (transmitter/receiver) 203, a baseband signal processor 204, a call processor 205 and a transmission path interface 206.

User data that is transmitted on the DL from the BS 20 to the UE 20 is input from the core network 30, through the transmission path interface 206, into the baseband signal processor 204.

In the baseband signal processor 204, signals are subjected to Packet Data Convergence Protocol (PDCP) layer processing, Radio Link Control (RLC) layer transmission processing such as division and coupling of user data and RLC retransmission control transmission processing, MAC retransmission control, including, for example, HARQ transmission processing, scheduling, transport format selection, channel coding, inverse fast Fourier transform (IFFT) processing, and precoding processing. Then, the resultant signals are transferred to each transceiver 203. As for signals of the DL control channel, transmission processing is performed, including channel coding and inverse fast Fourier transform, and the resultant signals are transmitted to each transceiver 203.

The baseband signal processor 204 notifies each UE 10 of control information (system information) for communication in the cell by higher layer signaling (e.g., RRC signaling and broadcast channel). Information for communication in the cell includes, for example, UL or DL system bandwidth.

In each transceiver 203, baseband signals that are precoded per antenna and output from the baseband signal processor 204 are subjected to frequency conversion processing into a radio frequency band. The amplifier 202 amplifies the radio frequency signals having been subjected to frequency conversion, and the resultant signals are transmitted from the antennas 201.

As for data to be transmitted on the UL from the UE 10 to the BS 20, radio frequency signals are received in each antennas 201, amplified in the amplifier 202, subjected to frequency conversion and converted into baseband signals in the transceiver 203, and are input to the baseband signal processor 204.

The baseband signal processor 204 performs FFT processing, IDFT processing, error correction decoding, MAC retransmission control reception processing, and RLC layer and PDCP layer reception processing on the user data included in the received baseband signals. Then, the resultant signals are transferred to the core network 30 through the transmission path interface 206. The call processor 205 performs call processing such as setting up and releasing a communication channel, manages the state of the BS 20, and manages the radio resources.

(Configuration of User Equipment)

Figure 13:
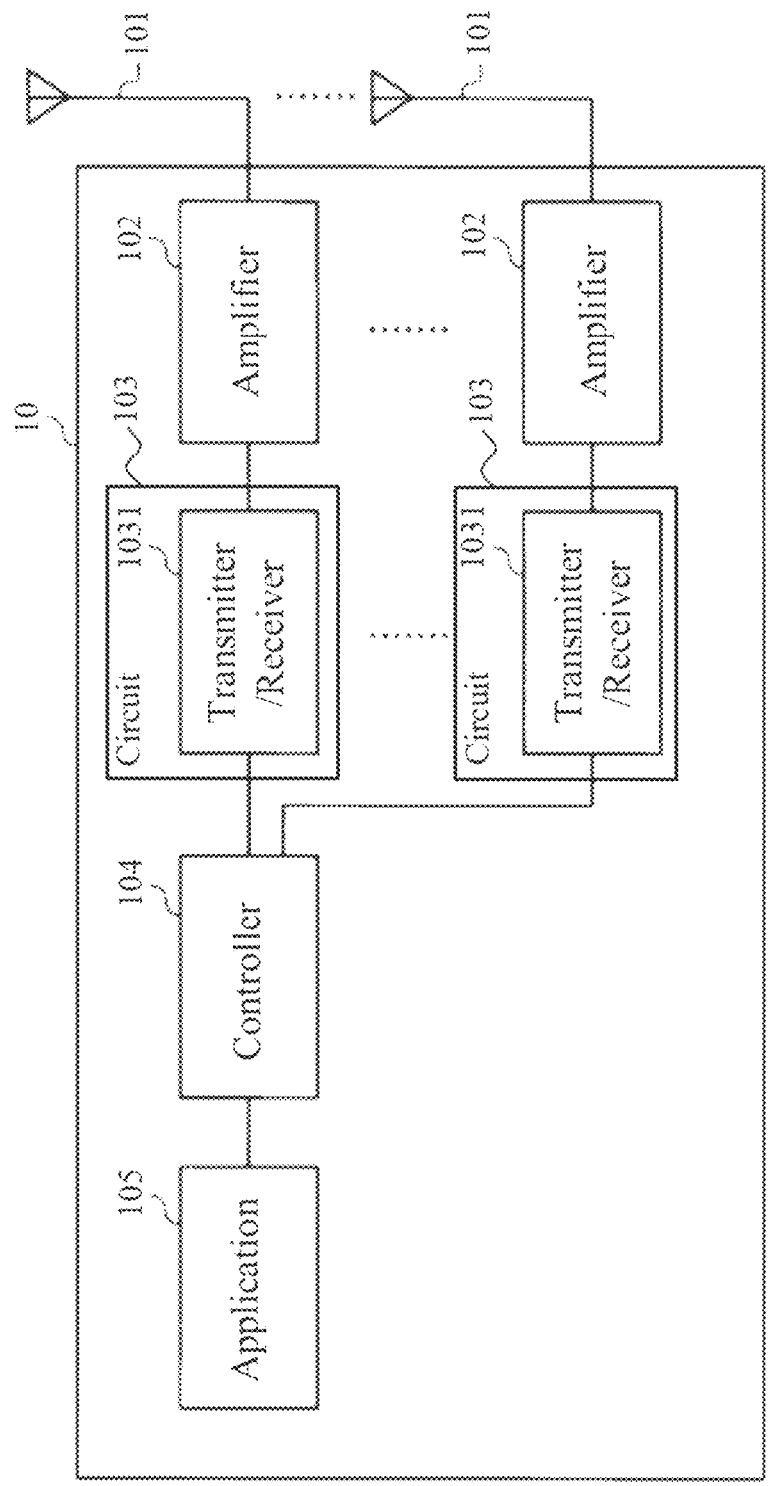
FIG. 13 is a diagram showing a schematic configuration of a user equipment (UE) according to one or more embodiments of the present invention.

The UE 10 according to one or more embodiments of the present invention will be described below with reference to FIG. 13. FIG. 13 is a schematic configuration of the UE 10 according to one or more embodiments of the present invention. The UE 10 has a plurality of UE antennas 101, amplifiers 102, the circuit 103 comprising transceiver (transmitter/receiver) 1031, the controller 104, and an application 105.

As for DL, radio frequency signals received in the UE antennas 101 are amplified in the respective amplifiers 102, and subjected to frequency conversion into baseband signals in the transceiver 1031. These baseband signals are subjected to reception processing such as FFT processing, error correction decoding and retransmission control and so on, in the controller 104. The DL user data is transferred to the application 105. The application 105 performs processing related to higher layers above the physical layer and the MAC layer. In the downlink data, broadcast information is also transferred to the application 105.

On the other hand, UL user data is input from the application 105 to the controller 104. In the controller 104, retransmission control (Hybrid ARQ) transmission processing, channel coding, precoding, DFT processing, IFFT processing and so on are performed, and the resultant signals are transferred to each transceiver 1031. In the transceiver 1031, the baseband signals output from the controller 104 are converted into a radio frequency band. After that, the frequency-converted radio frequency signals are amplified in the amplifier 102, and then, transmitted from the antenna 101.

One or more embodiments of the present invention relate to MAC CE timing design for PDCCH/PUCCH/PDSCH beam indication. For example, one or more embodiments of the present invention may be applied to a cases where one or more TCI states/spatial relation information configurations are configured for 1 Control Resource Set (CORESET) by RRC signaling. One or more embodiments of the present invention may be applied to a cases where eight or more TCI states/spatial relation information configurations are configured for PDSCH. One or more embodiments of the present invention may be applied to a cases where one or more TCI states/spatial relation information configurations are configured for 1 CORESET by RRC signaling.

Although the present disclosure mainly described examples of a channel and signaling scheme based on NR, the present invention is not limited thereto. Embodiments of the present invention may apply to another channel and signaling scheme having the same functions as NR such as LTE/LTE-A and a newly defined channel and signaling scheme.

Although the present disclosure described examples of various signaling methods, the signaling according to embodiments of the present invention may be explicitly or implicitly performed.

The above examples and modified examples may be combined with each other, and various features of these examples can be combined with each other in various combinations. The invention is not limited to the specific combinations disclosed herein.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. A terminal comprising:
   a receiver that receives a Medium Access Control Control Element (MAC CE) activation command for activating one or more Transmission Configuration Indication (TCI) states for Physical Downlink Shared Channel (PDSCH) reception and that receives Downlink Control Information (DCI) via a Physical Downlink Control Channel (PDCCH);
   a transmitter that transmits, in slot n, a Hybrid Automatic Repeat Request (HARQ) for the MAC CE activation command; and
   a processor that applies mapping between the one or more TCI states to be activated and one or more codepoints of a field of the DCI that is Transmission Configuration Indication from a slot that is k slots after the slot n for the HARQ transmission,
   wherein the value of the k is indicated based on Radio Resource Control (RRC) signaling.

2. The terminal according to claim 1, wherein the one or more TCI states are indicated using RRC signaling.

3. The terminal according to claim 1, wherein the one or more TCI states indicate a QCL relationship between one or more downlink reference signals and one or more Demodulation Reference Signal (DM-RS) ports of the PDSCH.

4. A communication method by a terminal, the method comprising:
   receiving a Medium Access Control Control Element (MAC CE) activation command for activating one or more Transmission Configuration Indication (TCI) states for Physical Downlink Shared Channel (PDSCH) reception and receiving Downlink Control Information (DCI) via a Physical Downlink Control Channel (PDCCH);
   transmitting, in slot n, a Hybrid Automatic Repeat Request (HARQ) for the MAC CE activation command; and
   applying mapping between the one or more TCI states to be activated and one or more codepoints of a field of the DCI that is Transmission Configuration Indication from a slot that is k slots after the slot n for the HARQ transmission,
   wherein the value of the k is indicated based on Radio Resource Control (RRC) signaling.

5. A system comprising:
   a terminal; and
   a base station,
   wherein the terminal includes
      a receiver of the terminal that receives a Medium Access Control Control Element (MAC CE) activation command for activating one or more Transmission Configuration Indication (TCI) states for Physical Downlink Shared Channel (PDSCH) reception and that receives Downlink Control Information (DCI) via a Physical Downlink Control Channel (PDCCH);
      a transmitter of the terminal that transmits, in slot n, a Hybrid Automatic Repeat Request (HARQ) for the MAC CE activation command; and
      a processor that applies mapping between the one or more TCI states to be activated and one or more codepoints of a field of the DCI that is Transmission Configuration Indication from a slot that is k slots after the slot n for the HARQ transmission,
wherein the value of the k is indicated based on Radio Resource Control (RRC) signaling, and
wherein the base station includes
a transmitter of the base station that transmits the MAC CE activation command and that transmits the DCI via the PDCCH; and
a receiver of the base station that receives the HARQ for the MAC CE activation command.

* * * * *